(12) United States Patent
Okimoto et al.

(10) Patent No.: US 8,096,574 B2
(45) Date of Patent: Jan. 17, 2012

(54) AIR BAG SYSTEM FOR VEHICLE

(75) Inventors: Kohei Okimoto, Wako (JP); Naoki Takemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 12/243,163

(22) Filed: Oct. 1, 2008

(65) Prior Publication Data
US 2009/0091105 A1    Apr. 9, 2009

(30) Foreign Application Priority Data

Oct. 4, 2007   (JP) ................................. 2007-260608
Oct. 4, 2007   (JP) ................................. 2007-260679

(51) Int. Cl.
*B60R 21/20*   (2011.01)
*B60R 21/213*  (2011.01)

(52) U.S. Cl. .............................. 280/728.2; 280/730.2
(58) Field of Classification Search ............... 280/728.2, 280/730.2, 730.1
See application file for complete search history.

(56) References Cited

U.S. PATENT DOCUMENTS

| | | | |
|---|---|---|---|
| 5,921,575 A | 7/1999 | Kretschmer et al. | |
| 6,079,732 A | 6/2000 | Nakajima et al. | |
| 6,149,185 A * | 11/2000 | White et al. | 280/728.2 |
| 6,340,171 B1 * | 1/2002 | Hirth et al. | 280/730.2 |
| 6,520,533 B2 * | 2/2003 | Tanase et al. | 280/730.2 |
| 6,761,374 B2 * | 7/2004 | Di Sante et al. | 280/728.2 |
| 7,631,889 B2 * | 12/2009 | Watanabe | 280/728.2 |
| 7,712,775 B2 * | 5/2010 | Sato et al. | 280/730.2 |
| 7,722,113 B2 * | 5/2010 | Kamiya et al. | 296/187.05 |
| 2003/0001365 A1 | 1/2003 | Ochiai et al. | |
| 2004/0000776 A1 * | 1/2004 | Yamamura et al. | 280/730.2 |
| 2005/0225060 A1 * | 10/2005 | Wold | 280/728.2 |
| 2006/0082108 A1 * | 4/2006 | Wahara et al. | 280/730.2 |
| 2006/0267315 A1 * | 11/2006 | White, Jr. | 280/730.2 |

(Continued)

FOREIGN PATENT DOCUMENTS

JP           10181512 A   *  7/1998

(Continued)

OTHER PUBLICATIONS

Masahide Miyazaki, Protecting Device for Vehicle Occupant, Oct. 15, 2003, JPO, JP 2003-291768, English Abstract.*

(Continued)

*Primary Examiner* — Paul N Dickson
*Assistant Examiner* — James English
(74) *Attorney, Agent, or Firm* — Rankin, Hill & Clark LLP (57) ABSTRACT

An air bag system for a vehicle including a cover for housing an air bag in a folded state along a side of a roof of the vehicle is provided. The cover includes a pair of opposed walls approximately parallel to each other, a connection wall that connects the pair of the opposed walls, an opening that is defined by the pair of the opposed walls and opens downward, a bent section that is formed to be bent three-dimensionally upward and inward so as to go along a face shape of the vehicle body where the cover is installed, at least one load transmission part that is provided on the connection wall so as to transmit a load from a vehicle interior side to a vehicle exterior side, and a locking portion that is provided on the load transmission part on the vehicle exterior side.

20 Claims, 7 Drawing Sheets

U.S. PATENT DOCUMENTS

2007/0210561 A1* 9/2007 Yamagiwa et al. ........ 280/730.2
2007/0296185 A1* 12/2007 Hidaka et al. .............. 280/728.2
2009/0091102 A1* 4/2009 Okimoto .................... 280/728.2

FOREIGN PATENT DOCUMENTS

| JP | 2003-002129 | | 1/2003 |
| --- | --- | --- | --- |
| JP | 2003291768 A | * | 10/2003 |
| JP | 2004-075043 | | 3/2004 |
| JP | 2004-182144 | | 7/2004 |
| JP | 2006-088846 | | 4/2006 |
| JP | 2006-096076 | | 4/2006 |
| JP | 2006-327340 | | 12/2006 |
| JP | 2007-091199 | | 4/2007 |
| JP | 2007131172 A | * | 5/2007 |

OTHER PUBLICATIONS

Masahide Miyazaki, Protecting Device for Vehicle Occupant, Oct. 15, 2003, JPO, JP 2003-291768, Machine Translation of Description.*
Nakajima et al., Arrangement Structure of Air Bag Device for Automobile, Jul. 7, 1998, JPO, JP 10-181512 A, English Abstract.*
Nakajima et al., Arrangement Structure of Air Bag Device for Automobile, Jul. 7, 1998, JPO, JP 10-181512 A, Machine Translation of Description.*
Yoshida et al., Curtain Air Bag Device, May 31, 2007, JPO, JP 2007-131172 A, English Abstract.*
Yoshida et al., Curtain Air Bag Device, May 31, 2007, JPO, JP 2007-131172 A, Machine Translation of Description.*

* cited by examiner

AIR BAG SYSTEM FOR VEHICLE

CROSS-REFERENCE TO RELATED APPLICATION

This application claims the foreign priorities benefit under 35 U.S.C. §119 of Japanese Patent Applications No. 2007-260679 filed on Oct. 4, 2007 and 2007-260608 filed on Oct. 4, 2007, the disclosures of which are incorporated herein by reference.

BACKGROUND OF THE INVENTION

1. Field of the Invention

The present invention relates to an air bag system for a vehicle, particularly to an air bag system for a vehicle, which unfolds and expands an air bag downward from an upper portion of each side window of a vehicle body in a curtain manner, so as to protect an occupant when a side impact is applied onto the vehicle.

2. Description of the Related Art

As disclosed in U.S. Pat. No. 5,921,575, an air bag system for a vehicle has been known, which unfolds and expands an air bag in a curtain manner over a side face of the vehicle interior, serving as a passenger protection system to protect an occupant's head when the vehicle undergoes a side impact or roll-over accident.

Such an air bag system for a vehicle that is disclosed in U.S. Pat. No. 5,921,575, is an occupant protection system, so-called as a curtain air bag system, which is extendedly provided from a front pillar via a roof side rail to a rear pillar. In such an air bag system for a vehicle, the air bag in a normal condition is housed in a folded state in a long (container-like) cover that is disposed in a space between a roof lining as an interior member for the vehicle interior and an inner member as part of the vehicle body.

The cover is formed like a long container that is disposed in the above-mentioned space along the roof lining in such a manner to downwardly face toward the vehicle exterior side. The cover is formed to be long and approximately straight in the longitudinal direction of the vehicle body, and the air bag is folded and housed in the cover, whose open end is closed with a cover member being clipped at an edge of the open end.

The air bag expands with gas supplied from an inflator when an impact is applied, so that the bag pushes and breaks the cover member at the open end of the cover, and pushes down the roof lining at its lower end towards the vehicle interior side, so as to open up the roof lining and expands towards the vehicle interior to protect an occupant or occupants.

Figure 8:
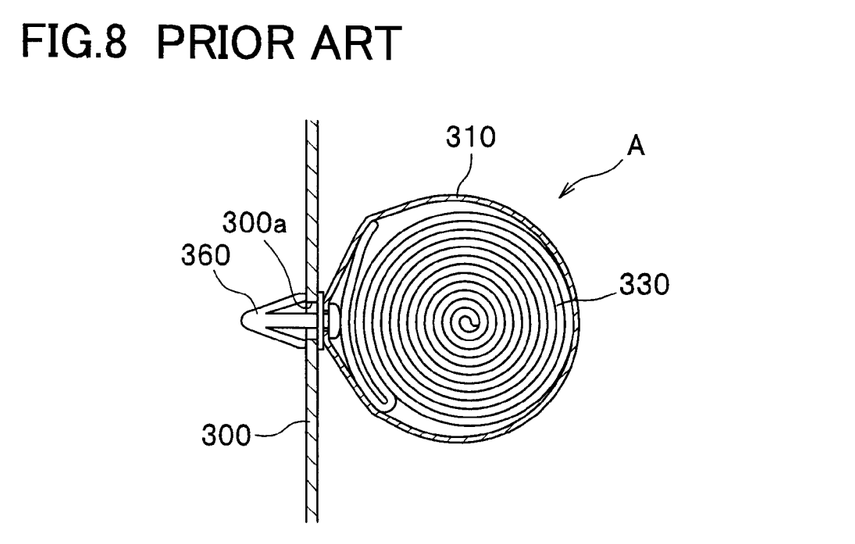
FIG. 8 shows a diagram of a conventional air bag system as a prior art.

In addition, another air bag system for a vehicle with a rolled air bag, disclosed in JP 2006-88846 A, is disposed extendedly between a front pillar and a roof side rail, and unfolds and expands the air bag downwards by gas injection from an inflator when an impact is applied onto the vehicle, so as to protect an occupant or occupants. FIG. 8 shows a diagram of this conventional air bag system as a prior art.

As shown in FIG. 8, the air bag system A houses a rolled air bag 330 in a cover 310, and is installed to the vehicle body in such a manner that a clip (also referred to as a "locking portion") 360 is inserted through a lock hole 300a of the roof side rail 300.

This air bag system A can be easily installed simply by pushing the cover 310 onto the roof side rail 300, resulting in reduction of time for installation of the system.

However, when such a conventional air bag system for a vehicle, as disclosed in U.S. Pat. No. 5,921,575, is disposed inside the roof lining, it is necessary to form the cover in such a manner as to be bent to avoid frame members such as a center pillar and other body frames of the vehicle body, in the light of the limited space. Therefore, it is necessary for a cover housing an air bag to be formed three-dimensionally, so as to go along the face shape of the vehicle body where the cover is installed.

In such a case, there has been a disadvantage that, at a bent position of the air bag, the direction where the air bag unfolds and expanses may vary depending on the manner in which the air bag is folded, and a stable expansion of the air bag in a desired direction cannot always be obtained. Note that a bent position is referred to as a position where the air bag gets twisted or bent due to a difference in pressure caused by difference in passage distance of inflation gas or a cell shape (formed by stitching).

In another conventional air bag system A, as disclosed in JP 2006-88846 A, pushed load is applied onto a cover 310 housing a rolled air bag 330 when the cover 310 is installed to a roof side rail 300, whereby the cover 310 deforms to be flat, which causes a pushing stroke loss or pushed load loss. Further, the conventional air bag A has another disadvantage that the rolled air bag 330 hinders an operator from checking the position of the clip 360 relative to a lock hole 300a of the roof side rail 300.

The present invention has an object to provide an air bag system that has an reliable expansion property of an air bag even if a cover is formed to be bent in order to go along a face shape of a vehicle body where the cover is installed, and that facilitates installation to a vehicle body.

SUMMARY OF THE INVENTION

According to an aspect of the present invention, an air bag system for a vehicle comprises a cover for housing an air bag in a folded state along a side of a roof of the vehicle, and the cover comprises a pair of opposed walls in approximately parallel to each other; a connection wall that connects the pair of the opposed walls; an opening that is defined by the pair of the opposed walls and opens downward; a bent section that is formed to be bent three-dimensionally upward and inward so as to go along a face shape of the vehicle body where the cover is installed; at least one load transmission part that is provided on the connection wall so as to transmit a load from a vehicle interior side to a vehicle exterior side; and a locking portion that is provided on the load transmission part on the vehicle exterior side.

Other features and advantages of the present invention will become more apparent from the following detailed description of the invention when taken in conjunction with the accompanying exemplary drawings.

BRIEF DESCRIPTION OF THE DRAWINGS

FIG. 3 show the cover of the air bag system according to the embodiment of the present invention.

DETAILED DESCRIPTION OF THE PREFERRED EMBODIMENTS

With reference to the attached drawings, descriptions will be provided on an air bag system for a vehicle according to the present invention.

Hereinafter, in the following descriptions, a traveling direction of a vehicle is referred to as "front" and a reverse direction thereof is referred to as "rear", and a lateral (width) direction of a vehicle is referred to as "right" and or "left" relative to the traveling direction of the vehicle. Before providing descriptions on an air bag system for a vehicle (hereinafter referred to simply as an "air bag system"), descriptions will be provided on a vehicle and vehicle body where the air bag system is installed.

Figure 1:
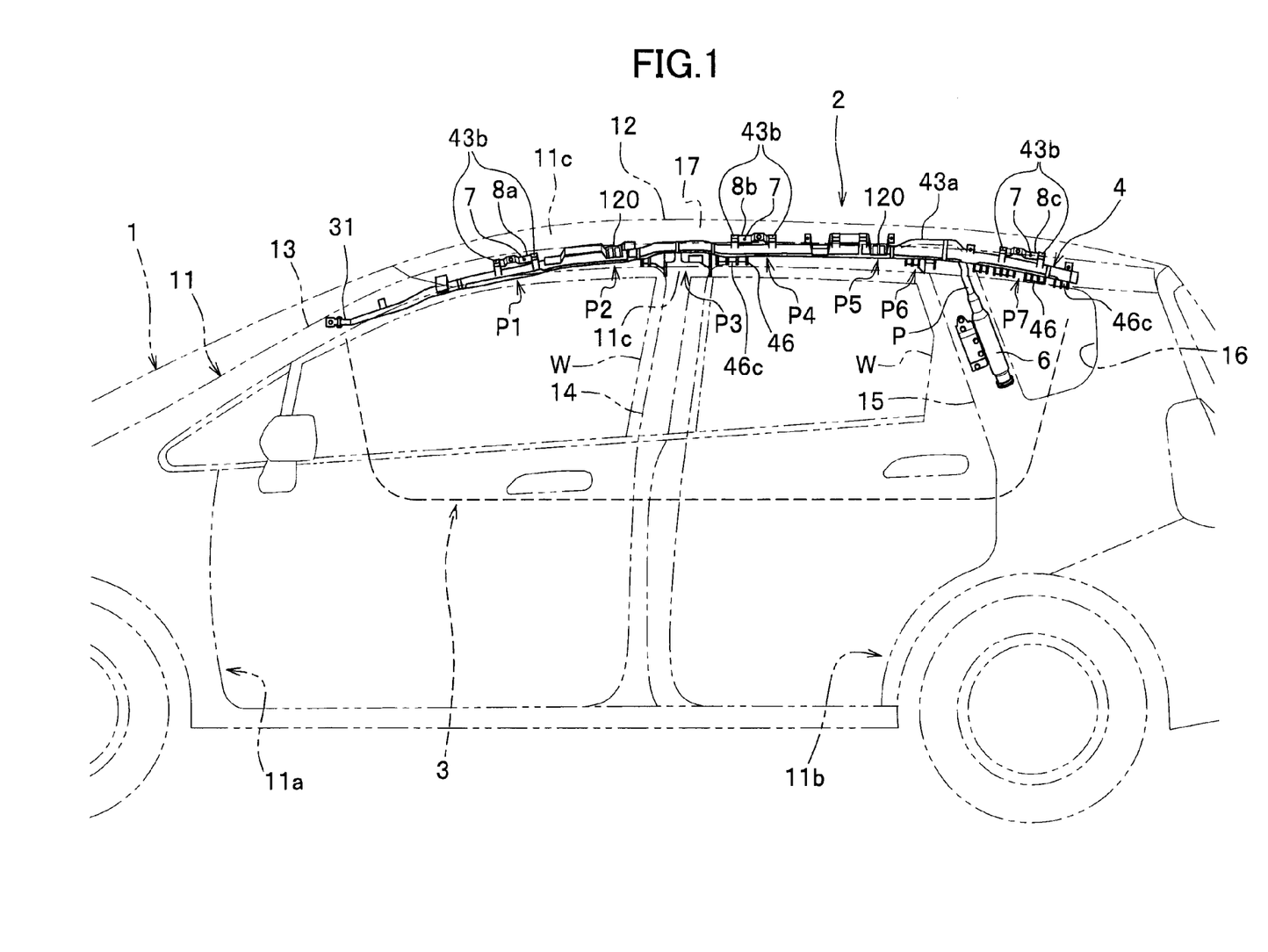
FIG. 1 is a schematic elevation view of an air bag system according to an embodiment of the present application.
Figure 2:
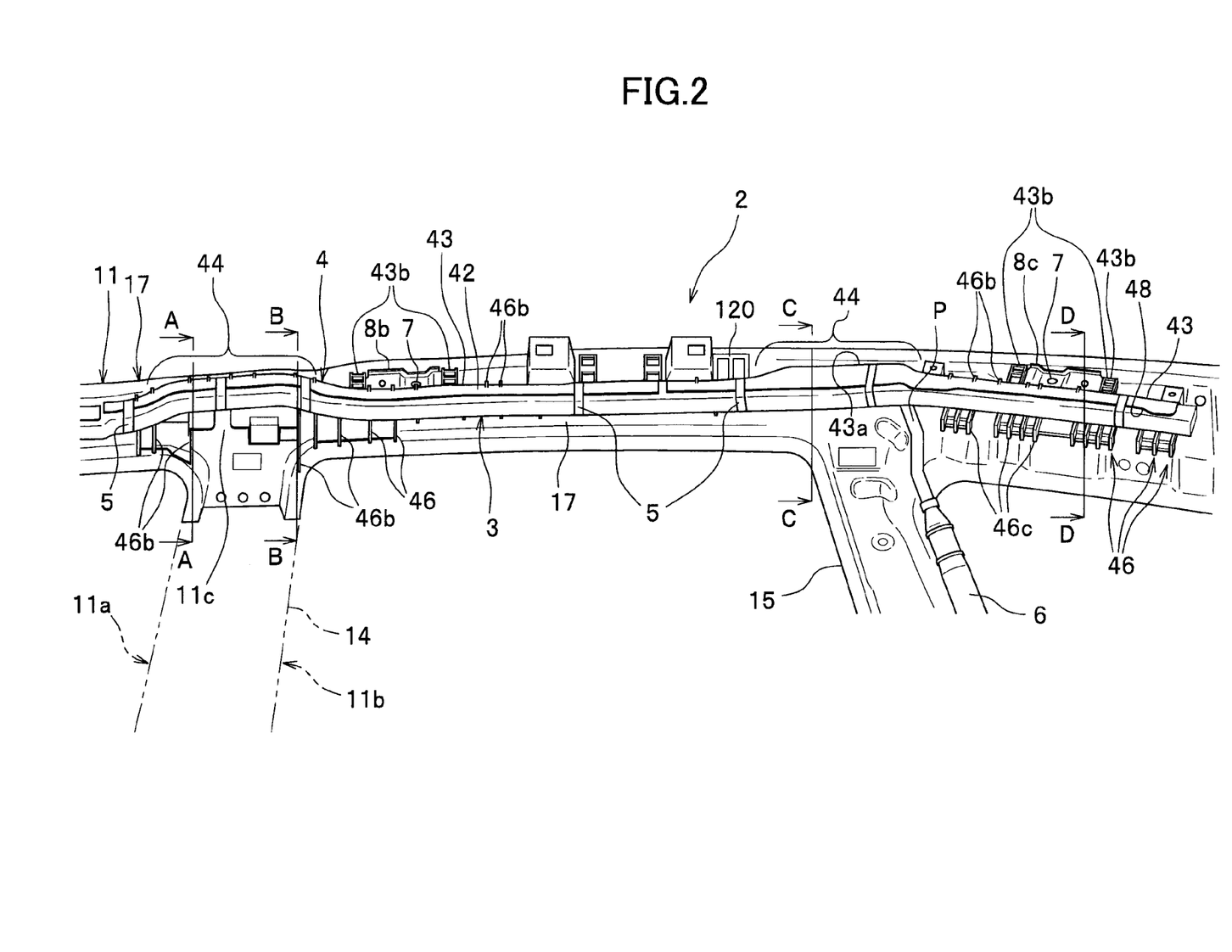
FIG. 2 is an enlarged view of a main part of the air bag system of FIG. 1, as main-part schematic elevation view showing how a cover is installed to a vehicle body.
Figure 3A:
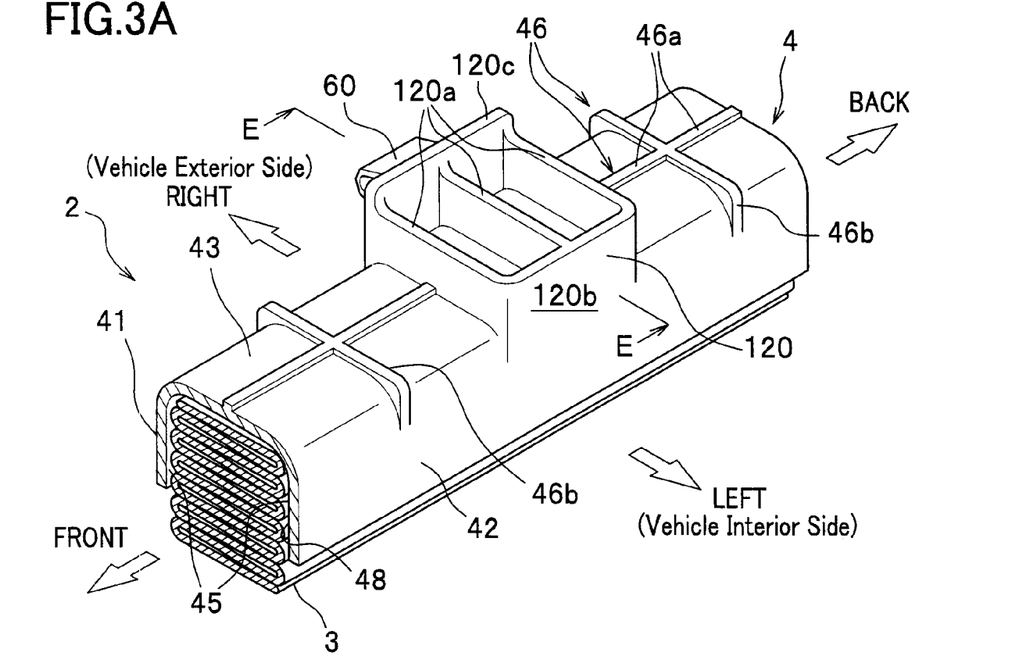
FIG. 3A is an enlarged perspective view of a main part showing how bending-prevention ribs, projection ribs and a load transmission part are provided.
Figure 3B:
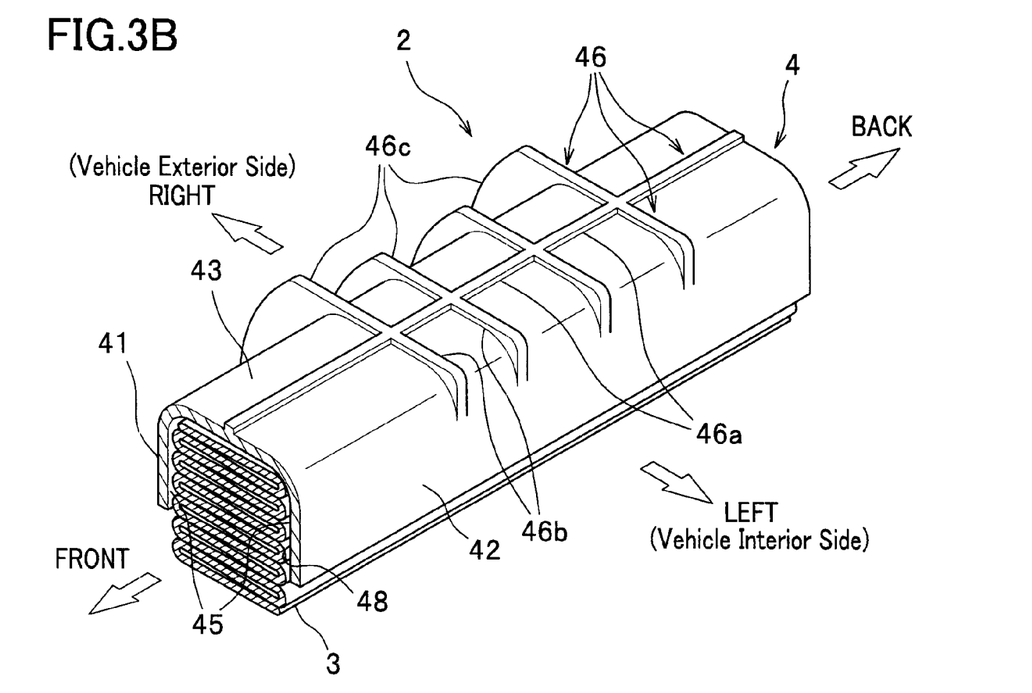
FIG. 3B is an enlarged perspective view showing how the bending-prevention ribs and fin-like ribs are provided.
Figure 3C:
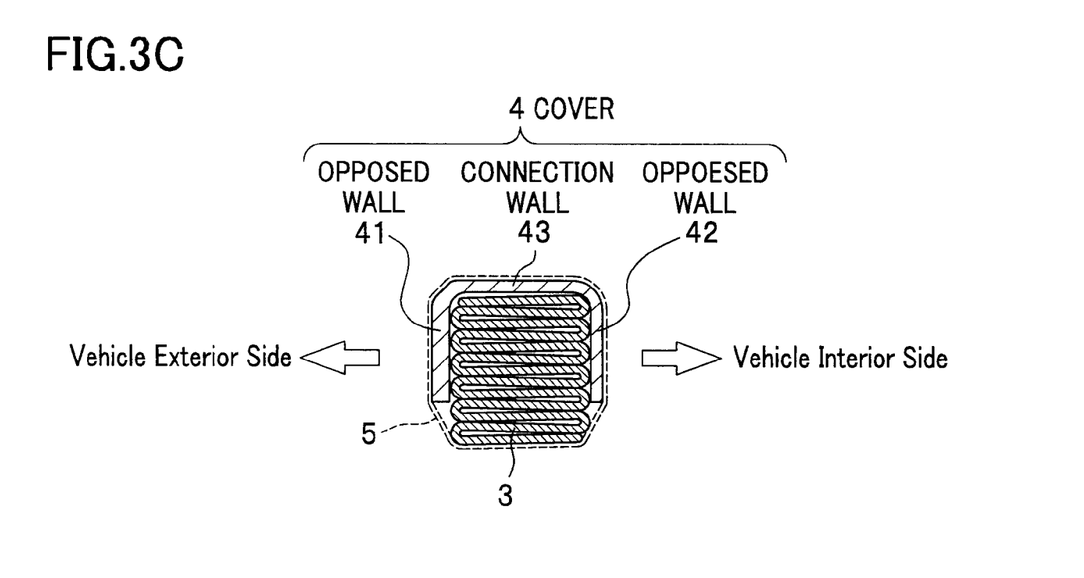
FIG. 3C is a cross-sectional view of the cover illustrated in FIGS. 3A and 3B, showing how the air bag is housed in the cover.
Figure 3D:
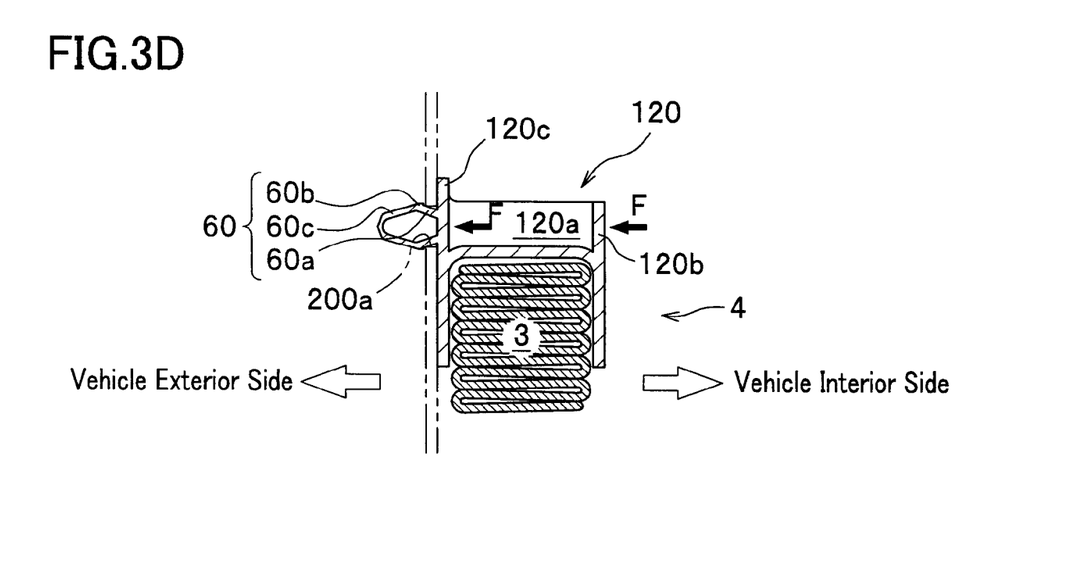
FIG. 3D is an enlarged cross-sectional view taken on the line E-E of FIG. 3A showing the cover provided with the load transmission part thereon.
Figure 4:
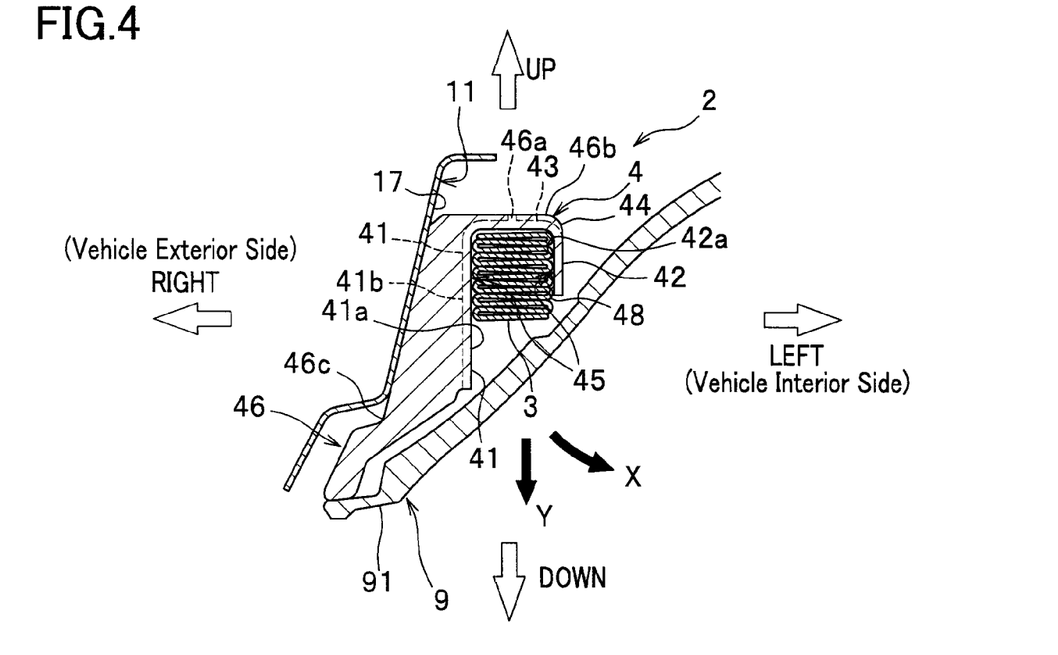
FIG. 4 is an enlarged cross-sectional view taken on the line A-A of FIG. 2.
Figure 5:
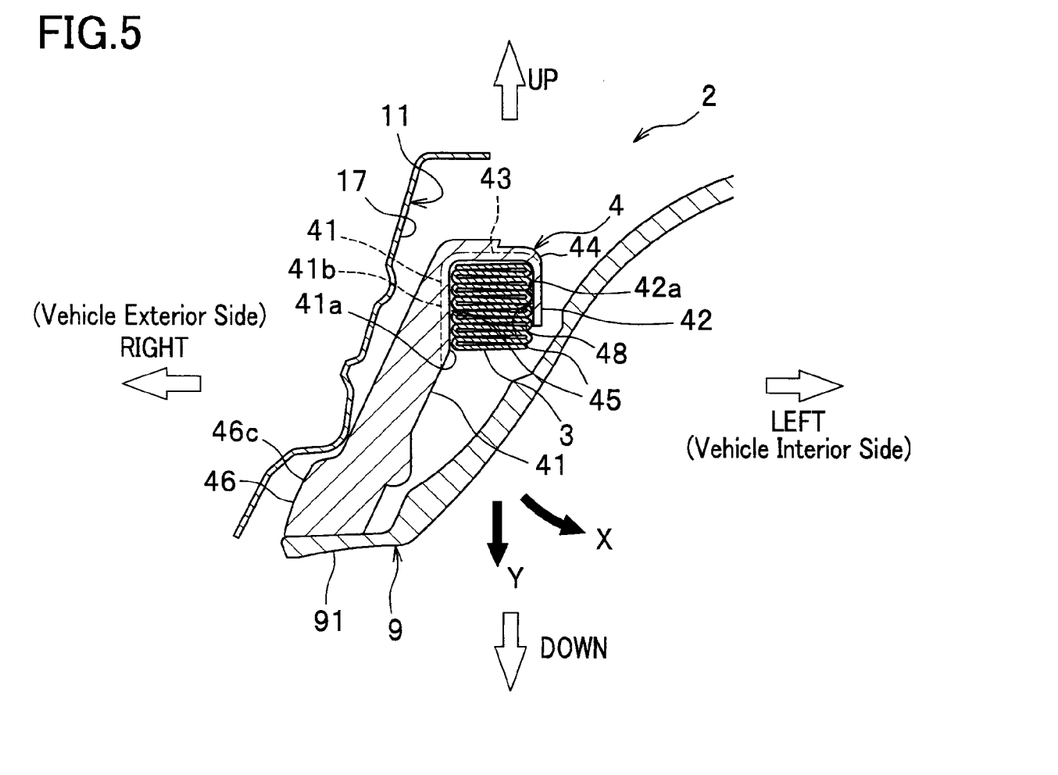
FIG. 5 is an enlarged cross-sectional view taken on the line B-B of FIG. 2.
Figure 6A:
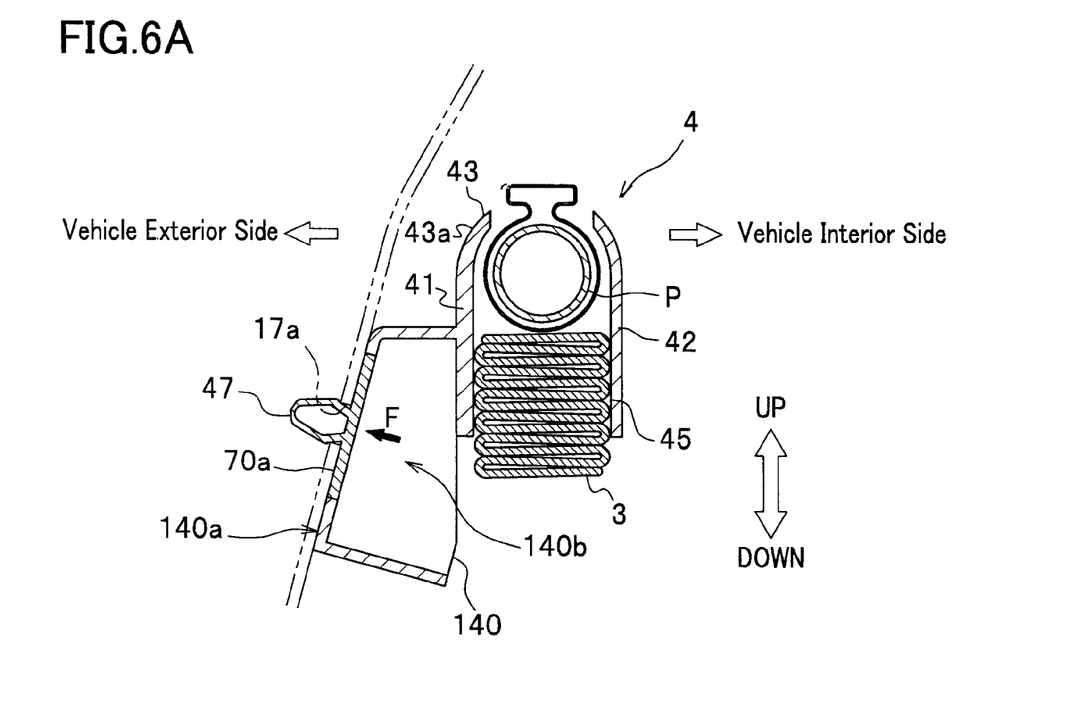
FIG. 6A is an enlarged cross-sectional view taken on the line C-C of FIG. 2.
Figure 6B:
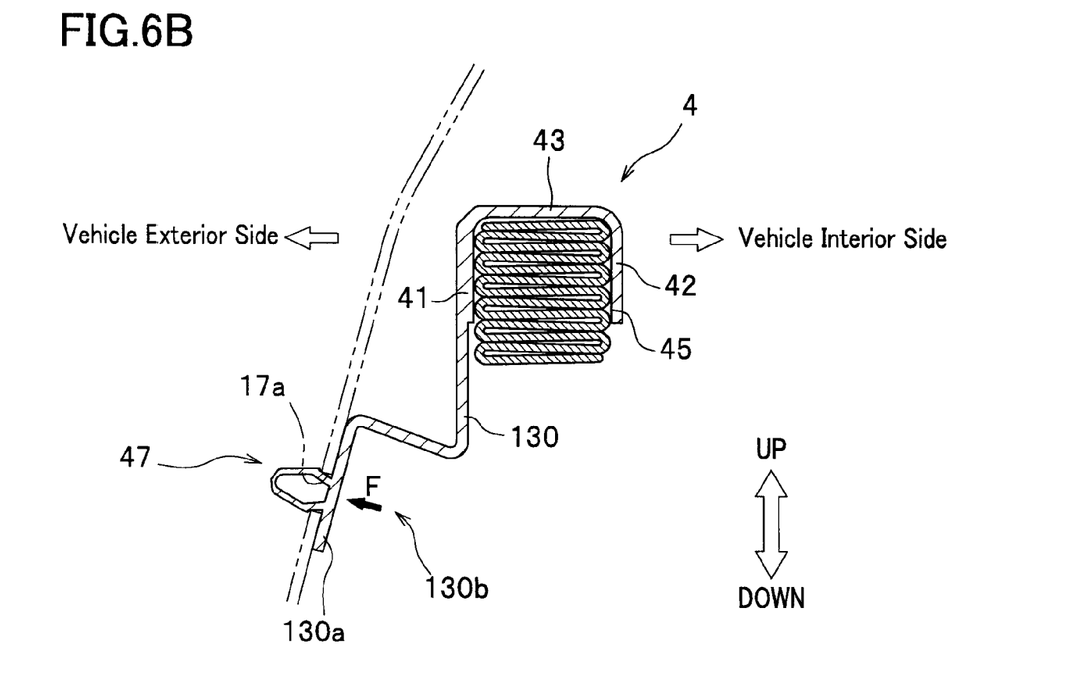
FIG. 6B is an enlarged cross-sectional view taken at a center between the line A-A and the line B-B of FIG. 2.
Figure 7:
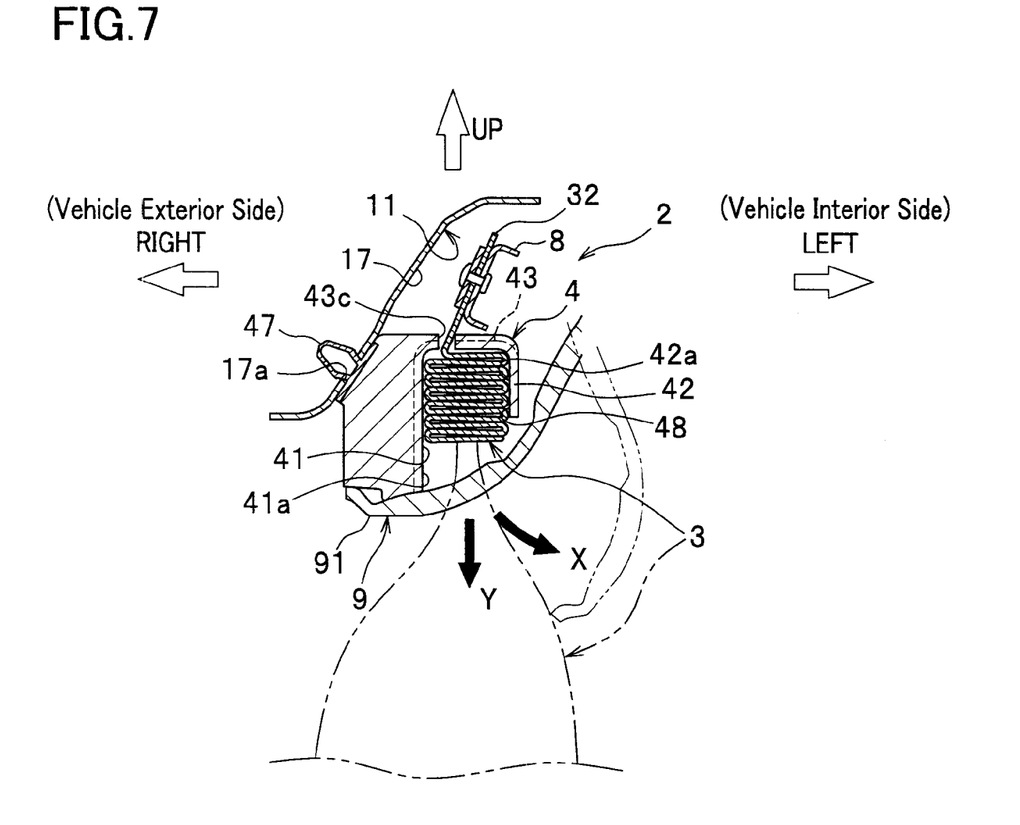
FIG. 7 is an enlarged sectional view taken on the line D-D of FIG. 2.

FIG. 1 is a schematic elevation view of an air bag system according to an embodiment of the present application. FIG. 2 is an enlarged view of a main part of the air bag system of FIG. 1, as a main-part schematic elevation view showing how the cover is installed to the vehicle body. FIGS. 3A and 3B show the cover of the air bag system according to the embodiment of the present invention. FIG. 3A is an enlarged perspective view of a main part showing how bending-prevention ribs, projection ribs and a load transmission part are provided, and FIG. 3B is an enlarged perspective view showing how the bending-prevention ribs and fin-like ribs are provided. FIG. 3C is a cross-sectional view of the cover illustrated in FIGS. 3A and 3B, showing how the air bag is housed in the cover. FIG. 3D is an enlarged cross sectional view taken on the line E-E of FIG. 3A showing the cover provided with the load transmission part thereon. FIG. 4 is an enlarged cross-sectional view taken on the line A-A of FIG. 2. FIG. 5 is an enlarged cross-sectional view taken on the line B-B of FIG. 2. FIG. 6A is an enlarged cross-sectional view taken on the line C-C of FIG. 2. FIG. 6B is an enlarged cross-sectional view taken at a center between the line A-A and the line B-B of FIG. 2. FIG. 7 is an enlarged cross-sectional view taken on the line D-D of FIG. 2.

<<Vehicle>>

As shown in FIG. 1, the vehicle 1 is provided with windows on the right and left sides of the vehicle body 11 thereof, and an air bag system 2 including an air bag 3 is provided on each side, so that the air bag 3 expands to cover the window on its side.

According to the present invention, the vehicle 1 may be applicable to a vehicle of any kind that has windows, not limited to a specific type of a vehicle. Hereinafter, descriptions will be given on the air bag system 2, with reference to an example of a passenger vehicle.

The vehicle 1 provided with the air bag system 2 may be, for example, a vehicle having one row of front seats only, or a vehicle having two or more rows of seats, such as a vehicle having three rows of front, intermediate and rear seats. In this specification, the vehicle 1 according to the present embodiment of the present invention will be described hereinafter, with reference to an example of the vehicle 1 having two rows of front and rear seats (not shown).

<Vehicle Body>

As shown in FIG. 1, on each side of the vehicle body 11, a front pillar 13 provided at a front side of the front seat (not shown), a center pillar 24 in the vicinity of a center of the vehicle body 11 between the front seats and the rear seats (not shown), a quarter pillar 15 provided at a rear side of the rear seats, and a rear pillar 16 are respectively jointed to a roof side rail 17 at the respective upper ends thereof, and a floor (not shown) and the roof 12 are also jointed via the above-mentioned pillars 13, 14, 15 and 16. A door opening portion 11a is provided between the front pillar 13 and the center pillar 14 of the vehicle body 11, where a side door on the front seat side is installed. A door opening portion 11b is provided between the center pillar 14 and the quarter pillar 15 of the vehicle body 11, where a side door on the rear seat side is installed.

<Roof Side Rail>

As shown in FIG. 2, the roof side rail 17 is a frame member that forms a peripheral edge of an upper portion 11c of the door opening portions 11a, 11b, and an upper portion of the side rail 17 is jointed to the roof 12 (see FIG. 1), and an lower portion thereof is jointed to the pillars such as the center pillar 14 and the quarter pillar 15. The respective joint portions of the roof side rail 17 to each of the pillar 13, 14, 15, 16 become thicker by the thickness of each pillar 13, 14, 15, 16, and protrude toward the vehicle interior side. The roof side rail 17 includes an inner member as an inner layer, a center member as a center layer and an outer member as an outermost layer.

<Roof Structure>

As shown in FIG. 1, the roof 12 is a member that forms a ceiling 12 of the vehicle 1, which includes a interior member 9 as an innermost layer (see FIGS. 4 to 7) on the vehicle interior side, an inner member as an inner layer (not shown), a center member (not shown) as an intermediate layer, and an outer member as an outermost layer (not shown). The lower end of the roof 12 and the upper end of the roof side rail 17 are jointed to each other, for example, by means of welding.

<Interior Member>

As shown in FIGS. 4, 5 and 7, the interior member 9 is a plate member to finish surfaces of the vehicle interior, and made of material having shock-absorption, insulation and rigidity properties. The interior member 9 includes a roof lining 91 that forms the ceiling surface of the vehicle interior and covers the cover 4, and a pillar garnish (not shown) that covers each pillar 13, 14, 15, 16, such as the center pillar 14 and the quarter pillar 15.

The roof lining 91 is provided so as to entirely cover the cover 4 such that the lower end of the roof lining 91 meets the lower end of the cover 4.

<<Air Bag System>>

As shown in FIG. 1, the air bag system 2 is an occupant protection system for protecting an occupant's head and body, etc. by instantly expanding the air bag 3 installed on the upper portion 11c of the door opening portions 11a and 11b, and the pillars 13, 14, 15, 16 as soon as an impact greater than a predetermined value is applied onto the side of the vehicle 1, due to a side impact accident or the like. The air bag system 2 is a so-called curtain air bag system that expands the air bag 3 downward in a curtain manner, as illustrated by the dot line in FIG. 1. The air bag system 2 is provided along the roof side rail 17, extending from the front pillar 13 via the roof side rail 17 to the rear pillar 16. The air bag system 2 includes the air bag 3, the cover 4, an inflator 6 (see FIG. 2), a pipe P, a collision detection sensor (not shown), and an electronic control unit (not shown).

Note that a pair of the air bag systems 2 are provided respectively on the right and left sides of the vehicle 11, each having the identical structure and equal operational effects, performing equally, too. Therefore, hereinafter, descriptions will be provided only on the air bag system 2 on the right side, and descriptions on the system 2 on the left side will be omitted.

<<Air Bag>>

As shown in FIG. 1, the air bag 3 is a bag-like protection that expands between the window glass of the side door and the occupant so as to hold and protect the occupant in the lateral direction, and is formed to be approximately bag-like using two pieces of ground fabric stitched with each other. The air bag 3, in a normal condition before expansion, is housed in the cover 4 in a folded state, as shown in FIGS. 3A to 3D. The air bag 3 is bound with binding bands 5 at predetermined positions along the longitudinal direction of the cover 4, so as to be held in the cover 4. Then, the cover 4 in which the air bag 3 is housed is fixed onto respective brackets 8 (described later) via respective bracket; fixtures 43b (described later), and then the brackets 8 are fixed onto the roof side rail 17 with fastening members 7 (described later), and also with sub-clips 47 (also referred to as a "sub-locking portions") (see FIGS. 6A, 6B and 7), thereby to be fixed to the vehicle body 11. The air bag 3 is provided at least at the upper end portion of the air bag 3 with a strap 31 (see FIG. 1) to fix the air bag 3 to the vehicle body 11, and with a plurality of fixing flaps 32 (see FIG. 7) provided at the upper end of the air bag 3. The air bag 3 is designed to expand by gas supplied from the inflator 6, break up the binding bands 5, pushes down and opens up the interior member 9 such as the roof lining 91 (see FIG. 7). Having completely expanded, the air bag 3 begins to shrink when the gas is released.

The air bag 3 further includes a gas supply port (not shown) to which a pipe P connected to the inflator to supply gas is attached, expansion sections (not shown) that expand by the gas supplied from the gas supply port so as to protect passengers, non-expansion sections (not shown) that do not expand without being supplied with the gas from the gas supply port, stitched portions (not shown) that are stitched so as to section the expansion and non-expansion sections, etc., in the air bag 3.

As shown in FIG. 1, the strap 31 is a band member to fix the air bag 3 at least to the front pillar 13, and is stitched to the upper front end of the air bag 3.

The fixing flaps 32 are plural projections that are fixed onto the respective brackets 8 (see FIGS. 1 and 2), and are provided on the air bag 3 at the upper end of the expansion sections that expand toward the front seat side and the upper end of the expansion sections that expand toward the rear seat side.

<<Cover>>

As shown in FIGS. 3A and 3B, the cover 4 is a long member that is provided along the roof side rail 17 on each side of the roof 12 of the vehicle 1, and that has an air bag housing portion 45 approximately in an up-side-down U shape, so as to house the air bag 3 folded therein. The cover 4 is, that is, a long synthetic resin case extending along the longitudinal direction of the vehicle body 11, having no cover member to cover its opening. The cover 4 also includes a pair of opposed walls 41, 42, approximately parallel to each other in the longitudinal direction of the vehicle body 11; a connection wall 43 that connects the opposed walls 41 and 42; load transmission parts 120 provided at appropriate positions on the upper face of the connection wall 42 in the longitudinal direction of the cover 4; an opening 48 that opens downward, defined by the opposed walls 41, 42 and the connection wall 43; bent sections 44 formed to be bent in the lateral (width) direction of the vehicle body 11 so as to go along the face shape of the vehicle body 11 where the cover 4 is installed, and reinforcement ribs 46, all of which are integrally formed.

The cover 4 is formed such that, in the cross-sectional view parallel to the lateral (width) direction of the vehicle body 11, the respective opposed walls 41, 42 approximately vertically extend downward. In the embodiment of the present invention, the opening 48 defined by the opposed walls 41, 42 is formed to face vertically downward, that is, the angle of the opening direction of the opening 48 relative to the vertical direction becomes zero.

As shown in FIGS. 4 and 7, the cover 4 is installed along the surface on the vehicle interior side of the roof side rail 17 that extends from the front pillar 13 (see FIG. 1) to the rear pillar 16 (see FIG. 1) while the opening 48 faces vertically downward, and is covered up with the interior member 9 such as the roof lining 91 and the pillar garnish.

<Air Bag Housing Structure>

As shown in FIGS. 3 to 7, the air bag housing portion 45 is a portion where the folded air bag 3 is housed, facing vertically downward approximately in an up-side-down U shape, extending from the front end to the rear end of the cover 4. The air bag housing portion 45 includes the connection wall 43 that forms the ceiling face of the cover 4, the opposed wall 41 that forms the side wall on the vehicle exterior side and the opposed wall 42 that forms the side wall on the interior side, having an opening at the bottom face thereof.

<Opposed Wall>

As shown in FIGS. 4 to 7, the opposed walls 41, 42 is plate-like members and define the side walls of the cover 4 in the upside-down U shape in the front elevation view, which are located oppositely to each other with a constant distance therebetween.

The opposed wall 41 on the vehicle exterior side is a plate-like member that extends vertically downward from the end of the connection wall 43 on the vehicle exterior side. The opposed wall 41 on the vehicle exterior side is provided with an inner-side wall face 41a, an outer-side wall face 41b, fin-like ribs 46c, sub-clips 47 (see FIGS. 6A, 6B and 7), all of which are integrally formed on the opposed wall 41.

The inner-side wall face 41a is a surface of the inner wall of the air bag housing portion 45 on the vehicle exterior side, and has a function of guiding the air bag to expand vertically downward when expanding.

The outer-side wall face 41b is a face opposite to the vehicle body 11 where the cover 4 is provided, on which fin-like ribs 46c are formed at appropriate positions with an appropriate distance therebetween. The outer-side wall face 41b of the cover 4 at the bent section 44 is formed to downwardly extend longer (described later) than the outer-side wall faces 41b at the other sections of the cover 4.

The fin-like ribs 46c are ribs for reinforcing the opposed wall 41, projecting from the opposed wall 41 toward the vehicle exterior side, and provided at appropriate positions. The fin-like ribs 46c abut to the surface of the roof side rail 17 on the vehicle interior side, and are supported onto the vehicle body 11.

The opposed wall 42 on the vehicle interior side is a plate-like member, extending vertically downward from the end of the connection wall 43 on the vehicle interior side. As shown in FIGS. 4 and 5, the opposed wall 42 on the vehicle interior side includes an inner-side wall face 42a that guides, along with the above-mentioned inner-side wall face 41a, the air bag 3 to expand vertically downward when expanding.

<Connection Wall>

As shown in FIG. 4, the connection wall 43 forms the upper face of the cover 4 and the ceiling face of the air bag housing portion 45, formed in an approximately plane manner. On the upper face of the connection wall 43, bending-prevention ribs 46a and projecting robs 46b, pipe-installation portion 43a (see FIG. 6A), the bracket fixtures 43b (see FIGS. 1 and 2), and through holes 43c (see FIG. 7) are formed at respective appropriate positions in the predetermined numbers. In addition, the connection wall 43 is provided on the upper face thereof with the load transmission parts 120 (described later) at appropriate positions along the longitudinal direction of the cover 4.

As shown in FIG. 6A, the pipe installation portion 43a is a portion for installing in the cover 4 the pipe P, one end of which is attached to the supply port of the air bag 3 in the cover 4. As shown in FIG. 2, the pipe installation portion 43a is, for example, provided in the vicinity of the joint position between the roof side rail 17 and the quarter pillar 15.

The bracket fixture 43b (see FIGS. 1 and 2) is a portion to which each bracket 8 is fixed, thereby to fix the cover 4 to the vehicle body 11. In the embodiment of the present invention, as shown in FIG. 2, a pair of the bracket fixtures 43b are provided on the upper face of the connection wall 43 in the longitudinal direction at each position that corresponds to the respective bracket 8.

As shown in FIG. 7, the through holes 43c are slit holes for passing the fixing flaps 32 of the air bag 3 from the air bag housing portion 45 of the cover 4 through the upper face of the connection wall 43. In the embodiment of the present invention, the through holes 43c, for example, are provided on the upper face of the connection walls 43 at appropriate positions that correspond to any two of the brackets 8a, 8b, 8c.

<Load Transmission Part>

Hereinafter, the load transmission parts and the main-clips will be described.

As shown in FIG. 1, the load transmission parts 120 are provided on the upper face of the connection wall 43 at appropriate positions along the longitudinal direction of the cover 4. In this embodiment of the present invention, for example, a couple of the load transmission parts 120 are provided, one between the bracket 8a and the bracket 8b, and the other between the bracket 8b and the bracket 8c, as shown in FIGS. 1 and 2. Since both of the load transmission parts 120, 120 have an identical structure, hereinafter, descriptions will be provided only on the load transmission part 120 on the front side of the vehicle 1, with reference to FIGS. 3A and 3D.

The load transmission part 120 serves for transmitting a load from the vehicle interior side to the vehicle exterior side of the vehicle 1. Specifically, as described later, when an operator installs the air bag system 2 to the roof side rail 17, the operator applies a load from the vehicle interior side to the load transmission part 120 so that the applied load can be transmitted to a main-clip 60 described later (also referred to as a "main locking portion") (see FIG. 3A) provided on the load transmission part 120 on the vehicle exterior side.

As shown in FIG. 3A, the load transmission part 120 chiefly includes three ribs 120a, 120a, 120a in series on the upper face of the connection wall 4, an inner-side wall face 120b, and an outer-side wall face 120c. The ribs 120a, 120a, 120a are provided in the direction from the vehicle interior side toward the vehicle exterior side of the vehicle 1. The inner-side wall 120b is provided along the longitudinal direction of the cover 4 so as to connect each end of the ribs 120a, 120a, 120a on the vehicle interior side, and the outer-side wall face 120c is provided along the longitudinal direction of the cover 4 so as to connect each end of the ribs 120a, 120a, 120a on the vehicle exterior side. The ribs 120a, 120a, 120a, the inner-side wall face 120b, and the outer-side wall face 120c are integrally formed with the cover 4.

The main-clip 60 is formed to be projected from the outer-side wall face 120c on the vehicle exterior side of the load transmission part 120 toward the vehicle exterior side.

As shown in FIG. 3D that is a cross-sectional view taken on the line E-E of FIG. 3A, the main-clip 60 is inserted into a lock hole 200a of the roof side rail 17, thereby to fix the cover 4 to the roof side rail 17. The main-clip 60 includes a base end 60a on the outer-side wall face 120c side with a width smaller than that of the lock hole 200a in the cross-sectional view, an intermediate portion 60b with a width wider than that of the lock hole 200a, and a tip end 60c with a width gradually smaller from the intermediate portion 60b than that of the lock hole 200a. The main-clip 60 according to this embodiment has a hollow inside thereof, and the intermediate portion 60b is elastically deformable to become smaller than the width of the lock hole 200a. In this embodiment, the main-clip 60 is integrally formed with the outer-side wall face 120c, for example.

<Bent Section>

As shown in FIG. 2, the bent section 44 of the cover 4 is formed to go along the face shape on the vehicle interior side of the vehicle body 11 at the upper portion 11c of each pillar such as the center pillar 14, so as to avoid the installed pillars. Specifically, the bent section 44 of the cover 4 is formed such that the cover 4 is bent three-dimensionally upward and inward at the position of the roof side rail 17 where components such as the center pillar 14 and the quarter pillar 15 are installed. Therefore, at the pillars installation positions on the roof side rail 17, the bent section 44 is bent in a three dimensional curve, going along the projected face shape of the installed pillars. As shown in FIGS. 2, 4 and 5, the bent section 44 has reinforcement ribs 46 that extend downward from the outer-side face wall 41b at the bent section 44.

<Reinforcement Ribs>

As shown in FIGS. 3A and 3B, plurality of reinforcement ribs 46 are projectedly formed on the longitudinal outer surface of the cover 4, and these reinforcement ribs 46 are integrally formed with the cover 4 to prevent the deformation of the cover 4. As shown in FIG. 3B, the reinforcement ribs 46 include bending-prevention ribs 46a for preventing the cover 4 from being curved, projected ribs 46b, and the fin-like ribs 46c. The cover 4 may have at least plural reinforcement ribs 46 in parallel to the lateral (width) direction of the vehicle body 11 at least on the connection wall 43.

Each bending-prevention ribs 46a is a liner rib in the planar view, provided at an approximate center of the connection wall 43 of the cover 4, extending in the longitudinal direction of the cover 4. The bending-prevention rib 46a is projectedly formed from the surface of the cover 4 in the planar view along the longitudinal direction of the cover 4, chiefly serving for preventing the cover 4 from being bent.

The projection ribs 46b (see FIGS. 3A, 3B, 4 and 5) are projections provided vertical to the bending-prevention ribs 46a, and the projection ribs 46b are projectedly formed from the outer circumferential face of the connection wall 43 to the outer circumferential faces of the opposed walls 42, 43, with a constant distance between each projection rib 46b.

The fin-like ribs 46c are projections formed on the opposed wall 42 of the cover 4 on the vehicle exterior side, which is provided vertical to the bending-prevention ribs 46a, with a constant distance between each fin-like ribs 46c. The fin-like ribs 46c serve for enhancing the strength and stiffness of the cover 4.

<Sub-Clip and Finger-Insert>

Descriptions will be provided on a sub-clip and a finger-insert, hereinafter.

As shown in FIGS. 6A, 6B and 7, the sub-clip 47 is a locking member serving for tentatively fixing the cover 4 to the vehicle body 11 by being engaged into a lock hole 17a punched through the roof side rail 17, and is integrally formed with the outer-side wall face 41b of the opposed wall 41 of the cover 4 on the vehicle exterior side (see FIGS. 4 and 5).

Any clip may be used as the sub-clip 47 if a clip can lock the cover 4 to the vehicle body 11 in a tentative manner, and its shape or the like is not limited to a specific kind. For example, the sub-clip 47 may be a general-purpose separate member from the cover 4.

As shown in FIGS. 1 and 2, at the position of the bent section 44 where the cover 4 is bent three-dimensionally upward and inward over the center pillar 14 and the quarter pillar 15, the connection wall 43 (see FIG. 3C) of the cover 4 is located upper than at the other positions.

As shown in the cross-sectional view of FIG. 6B, taken at the center between the lines A-A and B-B of FIG. 2, the face of the roof side rail 17 on the vehicle interior side where the cover 4 is fixed on the center pillar 14 side, is gradually sloped away from the cover 4 toward the vehicle exterior side as the face of the roof side rail 17 goes lower than the position of the cover 4.

The cover 4, fixed to the roof side rail 17 at the above-mentioned position, is provided with sub-locking brackets 130 that extends from the lower end of the opposed wall 41 on the vehicle exterior side and is bent, further extending obliquely downward to the vehicle exterior side. The end portion 130a of the sub-locking bracket 130 is sloped along the slope angle of the roof side rail 17 face on the vehicle interior side, and there is provide on the end portion 130a a sub-clip 47 projecting toward the outside of the vehicle body 11.

The sub-clip 47 is inserted through the lock hole 17a that is punched through the roof side rail 17, thereby to fix the cover 4 via the sub-locking bracket 130 to the roof side rail 17, and is located lower than the connection wall 43 of the cover 4. The sub-clip 47 is formed in the same manner of the main-clip 60 (see FIG. 3A), therefore, detailed explanations thereon will be omitted.

The sub-clip 47 has a finger-insert 130b on the vehicle interior side, as space on the vehicle interior side separated by the sub-locking bracket 130 that is formed to be bent.

The face of the roof side rail 17 on the vehicle interior side, where the bent section 44 of the cover 4 bent three-dimensionally upward and inward over the quarter pillar 15 (see FIG. 1) is fixed, is gradually sloped away from the cover 4 toward the vehicle exterior side as this face of the roof side rail 17 extends lower than the cover 4.

Note that, at this position, the cover 4 has the opposed wall 41 on the exterior side and the opposed wall 43 on the interior side that are formed to downwardly extend lower than the cover 4 at the other positions (see FIG. 2), so as to secure enough space for installing the pipe P of the inflator 6 (FIGS. 1 and 2) under the connection wall 43.

The cover 4 at this position is provided with a sub-locking bracket 140 on the opposed wall 41 on the vehicle exterior side. The sub-locking bracket 140 has a slope face 140a that is sloped along the slope angle of the face of the roof side rail 17 on the vehicle interior side. On this slope face 140a, there is provided a sub-clip 47 that is separate from the sub-locking bracket 140. This sub-clip 47 has a seat portion 70a, which is fit into the slope face 140a, thereby to project the sub-clip 47 from the slope face 140a toward the outside of the vehicle body 11. The sub-clip 47 is inserted through the lock hole 17a of the roof side rail 17, thereby to fix the cover 4 to the roof side rail 17 via the sub-locking bracket 140. The sub-clip 47 is also located lower than the connection wall 43 of the cover 4, as is the same with the above-mentioned sub-clip 47 in FIG. 6B. Note that the sub-clip 47 is formed in the same manner of the main-clip 60 (see FIG. 3A), therefore, detailed explanations on the sub-clip 47 is omitted.

The sub-clip 47 is provided with a finger-insert 140b on the interior side as space of the vehicle interior side, spaced from the sub-locking bracket 140.

<<Brackets>>

As shown in FIGS. 1 and 2, the brackets 8a, 8b, 8c serve as a fixer that fixes the cover 4 to the vehicle body 11, and each end portion of the brackets 8a, 8b, 8c is attached to the respective bracket fixtures 43b (see FIGS. 1 and 2). Each of the bracket fixtures 8a, 8b, 8c has a through hole at its center, through which a fastening member 7 such as a bolt is inserted, and the fastening members are screwed to the roof side rail 17 so that the brackets 8a, 8b, 8c are secured to the vehicle body 11.

<<Inflator>>

The inflator 6 is a gas generation apparatus including an ignition (not shown) electrically connected to a collision detection sensor (not shown) that detects an impact onto the left side face of the vehicle 1, and gas generation agent (not shown) made of sodium azide and the like. In response to a collision signal sent from the collision detection sensor, the inflator 6 instantly operates in such a manner that the ignition fires the gas generation agent of the ignition to generate high-pressure nitrogen gas to be supplied to the air bag 3, whereby the air bag 3 expands instantly. The inflator 6 is, for example, installed on the quarter pillar 15.

The pipe P is a metal tube that connects the air bag 3 and the inflator 6.

The collision detection sensor is an apparatus for detecting an impact applied from the lateral direction due to a side impact crash, turn-over, or the like, of the vehicle 1, and may be an acceleration sensor (G sensor), for example. One or more collision detection sensors may be installed on the vehicle 1 at one or more positions.

<<Air Bag System Installation>>

Hereinafter, descriptions will be provided on detailed processes to install the air bag system of the embodiment of the present invention to the vehicle body 11, with reference to FIGS. 1 to 7.

When installing the air bag 3 to the vehicle body 11, first, the air bag 3 is folded along the longitudinal direction as shown in FIGS. 3A to 3D, and then the folded air bag 3 is stored in the air bag housing portion 45 of the cover 4 (see FIGS. 3A and 3B). The pipe P whose one end is connected to the inflator 6 is attached to the supply port on the air bag 3. Then, the folded air bag 3 is held in the cover 4 by biding the air bag 3 and the cover 4 with the binding bands 5 at appropriate positions of the air bag 3 and the cover 4, as shown in FIG. 2, so as to prevent the air bag 3 from coming off from the cover 4. The strap 31 at the upper front end of the air bag 3 is fixed to the front pillar 13 (see FIG. 1), and the fixing flaps 32 (FIGS. 1 and 2 show only a single flap) provided on the upper end of the air bag 3 at appropriate positions are fixed via the brackets 8a, 8b, 8c to the roof side rail 17.

In the present embodiment, as shown in FIG. 1, the installation of the cover 4 to the roof side rail 17 is carried out at the following positions, for example: P1 of the bracket 8a using the fastening member 7 (see FIGS. 1 and 2); P2 of the load transmission part 120 between the brackets 8a and 8b using the main-clip 60 (see FIG. 3A); P3 of the center pillar 14 using the sub-clip 47 (see FIG. 6B); P4 of the bracket 8b using the fastening member 7 (FIGS. 1 and 2); P5 of the load transmission part 120 between the brackets 8b and 8c using the main-clip 60 (see FIG. 3A); P6 of the quarter pillar 15 using the sub-clip 47 (see FIG. 6A); and P7 of the bracket 8c using the fastening member 7 (see FIGS. 1 and 2).

As mentioned above, the cover 4 is tentatively fixed to the roof side rail 17, with the main-clips 60 and the sub-clips 47 being inserted into the respective lock holes 200a and lock holes 37a, thereby to facilitate installing the cover 4 to the vehicle body 11 via the brackets 8a, 8b, 8c using the fastening members 7.

Then, the cover 4 is covered up with the roof lining 91, and the strap 31, the pipe P, the inflator 6 and each pillar are covered up with the pillar garnish (not shown). In this way, the installation of the air bag system 2 to the vehicle body 11 is completed.

<<Air Bag System Operation>>

Next, with reference to FIGS. 1 to 7, descriptions will be provided on how the air bag system 2 according to the embodiment of the present invention operates.

As shown in FIG. 1, while no impact is applied on the side of vehicle 1, the air bag 3 is housed in a folded state in the air bag housing portion 45 of the cover 4.

When an impact greater than a predetermined value is applied onto the side face of the vehicle 1, the collision detection sensor detects the impact, and then sends a collision signal to the electronic control unit (not shown). In response to the collision signal, the electronic control unit determines the side collision, and then sends an ignition signal to the inflator 6, so that the gas generation agent in the inflator 6 is rapidly combusted to generate high-pressure gas. This generated high pressure gas is supplied to the air bag 3.

As shown in FIG. 7, then, the air bag 3 folded in the cover 4 expands and breaks up the binding bands 5 (see FIG. 2), pushes down and opens up the roof lining 91 and the interior member 9 (in the direction of the arrow X), then develops vertically downward (in the direction of the arrow Y) while being guided by the inner-side walls 41a and 42a of the opposed wall 41 on the vehicle exterior side and the opposed wall 42 on the vehicle interior side. At this time, the cover 4 has no cover member at the opening 48 so that the cover 4 permanently opens downward; and the pair of opposed walls 41, 42 in parallel, extending approximately vertically downward, so that the opening angle of the opposed walls 41, 42 relative to the vertical direction becomes approximately zero. Thus, the air bag 4 smoothly and instantly expands in the vertical direction, and then develops toward an occupant so as to protect the occupant.

In particular, at the position of the bent section 44 formed in the three dimensional curved line in the plane view, the outer-side wall face 41b of the opposed wall 41 on the vehicle exterior side is formed to downwardly extend longer, thereby to restrict the expanding direction of the air bag 3 and guide the air bag 3 into the desired direction, as shown in FIGS. 4 and 5. The fin-like ribs 64c provided on the outer-side wall face 41b abut against the inner face of the vehicle body 11 and are securely fixed thereon. Since the cover 4 is provided with a plurality of the reinforcement ribs 46 on the connection wall 43 in the lateral (width) direction of the vehicle body 11, the resistance against the external force applied from the lateral direction of the vehicle 11 is enhanced, realizing more proper strength and stiffness.

Moreover, the cover 4 is constituted such that the reinforcement ribs 46 orthogonally cross the approximate u-shaped cross section of the cover 4. Even if the location of the reinforcement ribs 46 varies in the longitudinal direction of the cover 4, the supporting force by the ribs 46 can be maintained.

Thus, the air bag system 2 provides a uniform expansion direction due to the opening 48, and also uniforms bearing resistance along the longitudinal direction of the vehicle body 11 against the expansion of the air bag 3 onto the opposed walls 41, 42 toward the lateral direction of the vehicle body 11, so that a stable expansion direction of the air bag 3 can be secured.

As shown in FIG. 7, the air bag 3 is guided by the opposed walls 41, 42 and the outer-side wall face 41b, so that the air bag 3 can expand smoothly and instantly in the vertical direction (in the arrow Y direction) to cover the window opening W of the vehicle 1 rapidly.

As mentioned above, the air bag 3 expands over the side of the front and rear seats (not shown) as if a curtain is dropped over the whole left side of the inner vehicle body 11. Thus, the air bag 3 holds and protects the occupant's head, as well as preventing the occupant from jumping outside of the vehicle 1.

Note that the air bag system 2 in the identical configuration with the identical operational effects is also provided on the right side of the inner vehicle body 11, and operates in the same manner of the system 2 on the left side when an impact more than the predetermined value is applied on the right side of the vehicle 1.

The present invention is not, limited to the above-mentioned embodiments, and various modifications and changes may be applied within the scope of the technical idea of the present invention, and it is apparent to those skilled in the art that the present invention includes those modified and changed examples.

For example, the bent section 44 of the cover 4, as shown in FIG. 2, is not limited to being provided on the joint position between the roof side rail 17 and the center pillar 14. The bent section 44 may be formed at any positions, depending on the face shape where the cover 4 is installed. The bent section 44 may be formed to be bent or folded in a V-shape toward the vehicle interior side.

The means for fixing the cover 4 and the air bag 3 to the vehicle body 11 is not limited to a specific means, and may be a simple fastening member such as a screw, or other fastening members may be used.

In the present embodiment, it has been exemplified that the cover 4 is formed of synthetic resin, however, the cover 4 may be formed of light metal alloy such as aluminum alloy that can form a crushable zone to be bent when force is applied from the vehicle interior side toward the vehicle exterior side.

The air back system 2 for a vehicle 1 may be applicable to a vehicle of any type having a structure in which the cover 4 can be installed on the upper portion 11c of the door openings 11a and 11b.

Hereinafter, descriptions will be provided on the operational effects by the air bag system 2 according to the present invention.

As mentioned above, the cover 4 for installation to the vehicle body 11 has a bent section 44 that is bent three-dimensionally upward and inward, so as to go along the face shape of the vehicle body 11 where the cover 4 is installed. Accordingly, this reduces a redundant space within the interior member 9 of the vehicle body 11, resulting in preventing bulge of the interior member 9 toward the vehicle interior side.

The cover 4 is provided with the plural ribs 46 in parallel in the lateral direction of the vehicle body 11 on the connection wall 43, which enhance the strength and stiffness against the external force in the lateral direction.

As shown in FIG. 3D, the air bag system 2 according to the present embodiment, the main-clip 60 is projectedly formed from the outer-side wall face 120c of the load transmission part 120 on the connection wall 43 of the cover 4, so that the main-clip 60 is inserted into the lock hole 200a of the roof side rail 17. Therefore, the main-clip 60 is located on the upper position of the cover 4 where the air bag 3 is housed. Specifically, in the air bag system 2, as is different from the conventional air bag system A in FIG. 8, the folded air bag 3 does not hinder an operator from checking by sight the main clip 60 position relative to the lock hole 200a of the roof side rail 17. Thus, according to the present embodiment, the air bag system 2 facilitates the installation of the cover 4 to the roof side rail 17 since it is easier to check the main clip 60 position relative to the lock 200a of the roof side rail 17 by sight, compared to the conventional air bag system A.

In addition, in the air bag system 2 of the present embodiment, as shown in FIG. 3D, an operator pushes the load transmission part 120 (the inner-side wall face 120b) from the vehicle interior side toward the vehicle exterior side (roof side rail 17 side) when the operator inserts the main-clip 60 into the lock hole 200a of the roof side rail 17. The pushed load F in this way can be efficiently transmitted to the main-clip 60 via the rib 120a of the load transmission part 120 and the outer-side wall face 120c.

Therefore, in the air bag system 2 according to the present embodiment, different from the conventional air bag system A in FIG. 8 that pushes and transmits a load via the cover 310 where the folded air bag 330 is housed, the cover 4 is not deformed in flat, and thus reduces a pushing stroke loss and or pushed load F loss. Accordingly, the air bag system 2 according to the present embodiment significantly facilitates the installation to the roof side rail 17, compared to the conventional air bag system A.

In the air bag system 2 according to the present embodiment, when inserting the main-clip 60 through the lock hole 200a of the roof side rail 17, an operator pushes force onto the load transmission part 120, as mentioned above, as is different from the conventional air bag system A in FIG. 8 that applies load via the cover 4 hosing the folded air bag 330. Accordingly, this significantly reduces the deformation of the air bag 3 folded in the cover 4.

The air bag system 2 according to the present embodiment is provided with the sub-clip 47 (see FIGS. 6A, 6B and 7) provided lower than the connection wall 43 of the cover 4. Since the vehicle width gradually extends toward the vehicle exterior side as it goes lower than the connection wall 43, the sub-clip 47 provided lower than the connection wall 43 is located apart from the cover 4 toward the vehicle exterior side. Therefore, at the time of installing the cover 4 to the roof side rail 17, when a load is applied onto the opposed wall 42 of the cover 4 on the vehicle interior side, it may be difficult to efficiently transmit the pushed load F onto the sub-clip 47. However, the air bag system 2 of the present embodiment has the finger-inserts 130a and 140b (see FIGS. 6A and 6B) on the vehicle interior side of the sub-clip 47, and the pushed load F can be applied on the vehicle interior side of the sub-clip 47 via the finger-inserts 130b and 140b, thereby to efficiently transmit the pushed load F onto the sub-clip 47. Accordingly, this facilitates the insertion of the sub-clip 47 into the lock hole 17a of the roof side rail 17.

As mentioned above, the air bag system 2 according to the present embodiment, the installation of the cover 4 to the roof side rail 17 is carried on at the following positions: P1 of the bracket 8a, P4 of the bracket 8b, P7 of the bracket 8c with the fixture members 7 (see FIGS. 1 and 2); P2 between P1 and P4, and P5 between P4 and P7 with the main-clips 60 of the load transmission part 120 (see FIG. 3), respectively, and P3 and P6 with the sub-clips 47 (see FIGS. 6A and 6B). Accordingly, the air bag system 2 according to the present embodiment enhances the installation strength of the cover 4 to the roof side rail 17. In addition, the air bag system 2 significantly facilitates the installation of the cover 4 to the vehicle body 11, by tentatively fixing the cover 4 to the roof side rail 17, and then fixing the cover 4 to the vehicle body 11 via the brackets 8a, 8b, 8c with the fixture members 7.

The present invention is not limited to the present embodiment, and may provide various modifications and changes within the technical idea of the present invention, and also include inventions with those modifications and changes.

For example, as shown in FIG. 2, the bent section 44 of the cover 4 is not limited to being provided at the joint position between the roof side rail 17 and the center pillar 14, and may be provided at appropriate positions to be formed to go along the face shape of the vehicle body 11 where the cover 4 is installed, and also may be provided at any other positions. The bent section 44 may be formed to be recessed or bent toward the vehicle interior side.

A means for fixing the cover 4 and the air bag 3 to the vehicle body 11 is not limited to a specific kind, and may be a fastening member such as a simple screw or any other fastening members.

In the present embodiment, it is exemplified that the cover 4 is formed of synthetic resin, and may be formed of light alloy metal such as aluminum alloy that can be a crushable zone to be bent when force is applied from the vehicle interior side toward the vehicle exterior side.

The air bag system for a vehicle 2 may be applicable to a motor vehicle of any kind, which has a structure that can install the cover 4 at the upper portion 11c of the door opening portions 11a and 11b.

In the present embodiment, the load transmission part 120 chiefly includes the ribs 120a, 120a, 120a, the inner-side wall face 120b, and the outer-side wall face 120c provided on the connection wall 43 of the cover 4. However, the present invention is not limited to this, and the structure of the load transmission part 120 may also be of a solid block, for example.

In the present embodiment, the main-clip 60 and the sub-clip 47 are formed of a hollow member. However, the present invention is not limited to this, and may also be of a solid member made of elastic material, for example.

The air bag system for a vehicle 2 according to the present invention provides an air bag system that has a more excellent expansion property of an air bag even if a cover is formed to be bent to go along a face shape of a vehicle body where the cover is installed, and also significantly facilitates installation of the air bag system 2 to a vehicle body side, compare to a conventional air bag system.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An air bag system for a vehicle comprising a cover for housing an air bag in a folded state along a side of a roof of the vehicle, the cover comprising:
  a pair of opposed walls approximately parallel to each other;
  a connection wall that connects the pair of opposed walls
  an opening that is defined by the pair of opposed walls and opens downward,
  a bent section that is formed to be bent three-dimensionally upward and inward so as to extend along a face shape of the vehicle body where the cover is installed;
  at least one load transmission part that is provided on an upper face of the connection wall and configured to transmit an applied load from a vehicle interior side to a vehicle exterior side, the load transmission part including at least one first rib provided along a lateral direction of the cover and an outer-side second rib and an inner-side second rib, each second rib provided along a longitudinal direction of the cover, the outer-side second rib being an extension of one of the opposed walls and the inner-side second rib being an extension of the other opposed wall; and
  a main locking portion that is provided on the load transmission part on the vehicle exterior side, the main locking portion having a locking member provided on the outer-side second rib for engaging the vehicle body, the applied load being transmitted to the main locking portion via the load transmission part for fixing the cover to the roof side.

2. The air bag system for a vehicle according to claim 1, wherein the cover further comprises at least one sub-locking portion provided on the opposed wall on the vehicle exterior side lower than the connection wall, the sub-locking portion having an integral locking member for connecting the cover to the roof side and a finger-insert provided on the vehicle interior side of the sub-locking portion as space on the vehicle interior side, wherein the finger-insert allows a pushed load to be applied on the vehicle interior side of the locking member.

3. The air bag system for a vehicle according to claim 1, wherein the bent section is provided at a position corresponding to an upper portion of a pillar.

4. The air bag system for a vehicle according to claim 2, wherein the bent section is provided at a position corresponding to an upper portion of a pillar.

5. The air bag system for a vehicle according to claim 1, wherein the cover is further provided on the connection wall with reinforcement ribs parallel to a lateral direction of the vehicle body.

6. The air bag system for a vehicle according to claim 2, wherein the cover is further provided on the connection wall with reinforcement ribs parallel to a lateral direction of the vehicle body.

7. The air bag system for a vehicle according to claim 3, wherein the cover is further provided on the connection wall with reinforcement ribs parallel to a lateral direction of the vehicle body.

8. The air bag system for a vehicle according to claim 4, wherein the cover is further provided on the connection wall with reinforcement ribs parallel to a lateral direction of the vehicle body.

9. The air bag system for a vehicle according to claim 1, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

10. The air bag system for a vehicle according to claim 2, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

11. The air bag system for a vehicle according to claim 3, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

12. The air bag system for a vehicle according to claim 4, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

13. The air bag system for a vehicle according to claim 5, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

14. The air bag system for a vehicle according to claim 6, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

15. The air bag system for a vehicle according to claim 7, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

16. The air bag system for a vehicle according to claim 8, wherein
  one of the pair of opposed walls on the vehicle exterior side further comprises an outer-side wall face, and
  the outer-side wall face at the bent section downwardly extends lower than the outer-side wall face at other positions along a longitudinal direction of the cover.

17. The air bag system for a vehicle according to claim 1, wherein, in a cross section parallel to the lateral direction of the vehicle body, the pair of opposed walls are formed to extend generally vertically downward such that an opening direction angle of the opening of the opposed walls relative to the vertical direction becomes approximately zero.

18. An air bag system for a vehicle including a vehicle body having a front pillar, a center pillar and a rear pillar, each pillar being joined to a roof side rail at respective upper ends thereof, the air bag system comprising:
  a continuous cover installed along the roof side rail and extending along a longitudinal direction of the vehicle body from the front pillar to the rear pillar, the cover including a pair of opposed walls approximately parallel to each other and a connection wall that connects the pair of opposed walls, the opposed walls and connection wall defining a housing portion having an opening that opens downward, the opening receiving an air bag in a folded state, the cover further including an integral first reinforcement rib extending outwardly from the opposed wall on a vehicle exterior side and downwardly past the opposed wall on the vehicle exterior side and the housing opening, the first reinforcement rib configured to abut the roof side rail on a vehicle interior side, the housing portion having a bent section that is formed to be bent three-dimensionally upward and inward at the position of the roof side rail where the upper end of one of the pillars is connected to the roof side rail so as to avoid the upper end, one of the pair of opposed walls of the bent section on a vehicle exterior side downwardly extends lower than that opposed wall at other positions along the housing portion; and at least one load transmission part integral with the cover is provided on the connection wall so as to transmit a load from a vehicle interior side to a vehicle exterior side, the load transmission part having an integral locking member for connecting the cover to the roof side rail.

19. The airbag system according to claim 18, wherein the cover is further provided on the connection wall with a second outwardly extending reinforcement rib positioned parallel to a lateral direction of the vehicle body.

20. An air bag system for a vehicle comprising a cover for housing an air bag in a folded state along a side of a roof of the vehicle, the cover comprising:
a pair of opposed walls approximately parallel to each other;
a connection wall that connects the pair of opposed walls
an opening that is defined by the pair of opposed walls and opens downward,
a bent section that is formed to be bent three-dimensionally upward and inward so as to extend along a face shape of the vehicle body where the cover is installed;
at least one load transmission part that is provided on the connection wall and spans between the opposed walls so as to transmit a load from a vehicle interior side to a vehicle exterior side;
a main locking portion having a main locking member that is provided on the load transmission part on the vehicle exterior side for fixedly connecting the cover to the side of the vehicle roof; and
a sub-locking portion provided on the opposed wall on the vehicle exterior side, the sub-locking portion having a sub-locking bracket connected to the opposed wall on the vehicle exterior side and a sub-locking member provided on the sub-locking bracket for tentatively connecting the cover to the roof side, the sub-locking bracket at least partially defining a finger-insert on the vehicle interior side of the sub-locking portion as space on the vehicle interior side, wherein the finger-insert allows a pushed load to be applied on the vehicle interior side of the sub-locking member.

* * * * *